(12) United States Patent
Nuss

(10) Patent No.: US 10,085,373 B2
(45) Date of Patent: Oct. 2, 2018

(54) HARVESTER COMBINE HEADER ASSEMBLY

(71) Applicant: Neal Nuss, Russell, KS (US)

(72) Inventor: Neal Nuss, Russell, KS (US)

(*) Notice: Subject to any disclaimer, the term of this patent is extended or adjusted under 35 U.S.C. 154(b) by 0 days.

(21) Appl. No.: 15/418,682

(22) Filed: Jan. 28, 2017

(65) Prior Publication Data

US 2017/0135278 A1 May 18, 2017

(51) Int. Cl.
*A01B 73/06* (2006.01)
*A01D 45/00* (2018.01)
*A01D 41/14* (2006.01)

(52) U.S. Cl.
CPC ............ *A01B 73/06* (2013.01); *A01D 41/144* (2013.01); *A01D 45/003* (2013.01)

(58) Field of Classification Search
CPC ....... A01B 73/02; A01B 73/06; A01B 73/065; A01D 41/144; A01D 41/148; A01D 75/002
USPC .................................................. 172/456, 311
See application file for complete search history.

(56) References Cited

U.S. PATENT DOCUMENTS

| | | | |
|---|---|---|---|
| 1,834,523 A | 12/1931 | Kaelling et al. | |
| 2,204,334 A | 6/1940 | Wagner | |
| 2,663,133 A | 12/1953 | Davis | |
| 2,805,612 A | 9/1957 | Beard | |
| 3,177,638 A | 4/1965 | Johnson | |
| 3,181,619 A | 5/1965 | Smith et al. | |
| 3,649,041 A | 3/1972 | Cervantez | |
| 3,762,140 A | 10/1973 | Block | |
| 3,841,412 A * | 10/1974 | Sosalla | A01B 73/02 16/231 |
| 3,971,446 A | 7/1976 | Nienberg | |
| 4,056,149 A * | 11/1977 | Honnold | A01B 73/067 172/311 |
| 4,257,213 A | 3/1981 | Brumat | |
| 4,318,444 A | 3/1982 | Hake | |
| 4,409,780 A | 10/1983 | Beougher et al. | |
| 4,706,445 A | 11/1987 | Woolsey | |
| 4,715,172 A | 12/1987 | Mosby | |
| 4,768,334 A | 9/1988 | Honey et al. | |
| 5,146,733 A * | 9/1992 | Klaeger | A01D 75/30 56/10.4 |

(Continued)

FOREIGN PATENT DOCUMENTS

| | | | | |
|---|---|---|---|---|
| EP | 1932416 | | 6/2008 | |
| EP | 1932416 A1 * | | 6/2008 | ........... A01B 73/065 |

(Continued)

*Primary Examiner* — Arpad Fabian-Kovacs
(74) *Attorney, Agent, or Firm* — Kenneth H. Jack; Davis & Jack, L.L.C.

(57) ABSTRACT

A header assembly for mounting upon a front end of a harvester combine's feeder house, the header assembly incorporating a central header which is adapted for fixed attachment to the feeder house front end; the header assembly further incorporating a lateral header and a pivot joint positioning an oppositely lateral end of the lateral header over the lateral end of the central header, the pivot joint being adapted for facilitating movements of the lateral header between a mowing position and a transport position, the lateral header cantilevering laterally over a crop edge upon pivoting to the mowing position and extending rearwardly upon counter-pivoting to the transport position.

11 Claims, 3 Drawing Sheets

(56) References Cited

U.S. PATENT DOCUMENTS

| | | |
|---|---|---|
| 5,199,250 A | 4/1993 | Ermacora et al. |
| 5,291,954 A | 3/1994 | Kirwan |
| 5,845,472 A * | 12/1998 | Arnold ................. A01D 41/144 56/228 |
| 5,911,625 A * | 6/1999 | Von Allworden ... A01D 41/144 460/119 |
| 6,164,052 A | 12/2000 | Golay |
| 7,043,889 B2 | 5/2006 | Rauch |
| 7,051,501 B2 | 5/2006 | Schlesser et al. |
| 7,404,283 B2 * | 7/2008 | Viaud ................. A01D 41/148 56/15.5 |
| 7,614,206 B2 | 11/2009 | Tippery et al. |
| 7,712,295 B2 | 5/2010 | Walter et al. |
| 8,225,588 B2 | 7/2012 | Hironimus et al. |
| 8,910,458 B2 | 12/2014 | Goudy |
| 8,919,088 B2 | 12/2014 | Dow et al. |
| 9,795,083 B2 * | 10/2017 | Van Vooren ........... A01B 73/06 |
| 2005/0028509 A1 * | 2/2005 | Viaud ................. A01D 41/148 56/341 |
| 2009/0320431 A1 | 12/2009 | Puryk et al. |
| 2013/0014481 A1 | 1/2013 | Dow et al. |
| 2015/0201552 A1 | 7/2015 | Bouten |
| 2015/0216121 A1 | 8/2015 | Roberge et al. |
| 2015/0223387 A1 | 8/2015 | Lykken |
| 2016/0066508 A1 * | 3/2016 | Van Vooren ........... A01B 73/06 56/12.7 |
| 2018/0035598 A1 * | 2/2018 | Wenger ................ A01B 73/065 |

FOREIGN PATENT DOCUMENTS

| | | |
|---|---|---|
| WO | WO95/28825 | 11/1995 |
| WO | WO2009/059791 | 5/2009 |

* cited by examiner

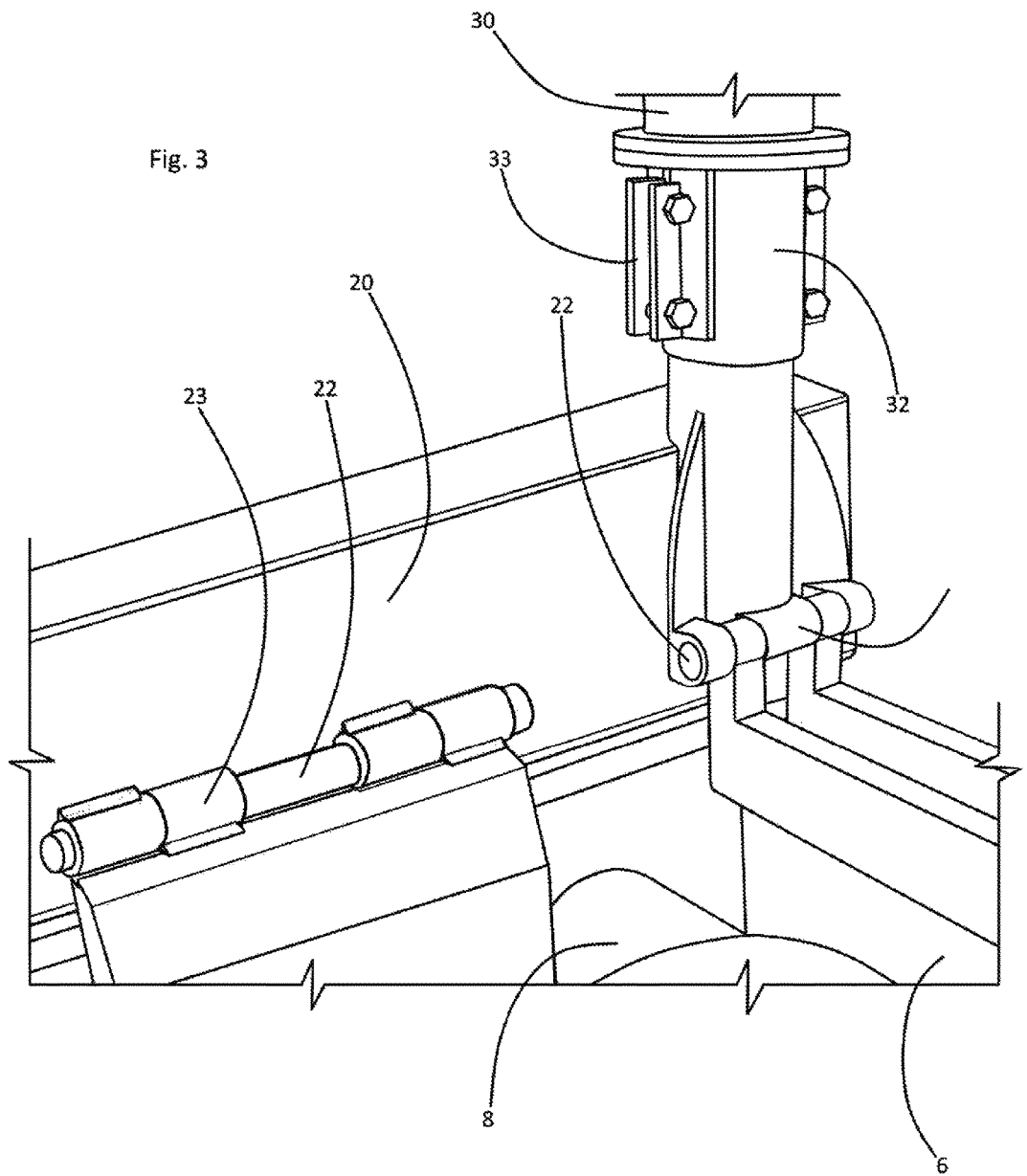

HARVESTER COMBINE HEADER ASSEMBLY

FIELD OF THE INVENTION

This invention relates to agricultural harvester combines. More particularly, this invention relates to crop cutting and collecting header assemblies which are attachable to such combines' forward feeder houses.

BACKGROUND OF THE INVENTION

Grain sorghum or milo crops are commonly harvested for use as animal feed grain or for use as whole plant silage. Where a milo crop is to be utilized for whole plant silage, the entirety of the plants, including the grain heads and the stalks may be cut and processed by a conventional combine harvester. In such harvesting process, the harvester's front end feeder house may be pivoted downwardly to lower a forward cutter bar of a centrally attached combine header to a low level which may cut the milo stalks near ground level.

Such conventional combine harvester may be alternatively utilized for harvesting only the grain heads of such milo crop for use as animal feed. In such alternative harvesting process, the feeder house and the centrally attached header may be raised to cut the milo stalks at an elevation immediately below the grain heads. In such alternative harvesting process, large quantities of uncut milo stalks pass rearwardly beneath the header, and significant portions of those uncut stalks may lie in the rolling paths of the combine's tires. Such uncut stalks are typically useful as silage; and where the combine's tires roll over such stalks, portions of valuable silage crop may be destroyed and wasted.

The instant inventive combine harvester header assembly solves or ameliorates the problems, defects, and deficiencies described above, by providing specialized structures which laterally cantilever a harvester header at a grain head height, and at a laterally removed position outside the paths of the combine's tires.

BRIEF SUMMARY OF THE INVENTION

A central header component of the instant inventive assembly is preferably adapted for fixed and removable mounting upon the forward feeder house of a combine harvester. In the preferred embodiment, the central header component opens substantially upwardly and is adapted for receiving cut plant material at an open lateral end. The central header is preferably further adapted for oppositely laterally conveying the cut plant materials to a central header opening which rearwardly communicate with the forward intake port of the feeder house. To facilitate such oppositely later conveyance of the plant materials, the central header preferably incorporates a powered auger or Archimedes screw which rotates about a lateral axis within the central header. As an alternative to or in addition to such auger's helical vane, plant material catching fingers or tines may be centrally installed.

A further structural component of the instant inventive header assembly comprises a lateral header which forwardly supports a laterally extending cutter bar having a multiplicity of reciprocating stalks cutting fingers. For purposes of weight reduction, the lateral header preferably comprises a draper header which incorporates a laterally spanning continuous loop belt whose upper flight is adapted for conveying the cut plant materials toward an open oppositely lateral end or output end of the lateral header. Suitably, the conveyor element of the lateral header may alternatively comprise a powered rotary auger.

A further structural component of the instant inventive header assembly comprises a pivot joint which fixedly positions the output end of the lateral header over the lateral end of the central header. In a preferred embodiment, the pivot joint is adapted for facilitating movements of the lateral header in the manner of a horizontally traveling swing arm, wherein the lateral header moves between a laterally cantilevering crop mowing position and a rearwardly extending transport position. In the preferred embodiment, the assembly's pivot joint component comprises a substantially vertically extending and cylindrically configured support column whose base or lower end is hingedly mounted at a rearward aspect of the lateral end of the assembly's central header. The preferred hinged mount of the base end of the support column may be advantageously configured to include a longitudinal extension or an "L" foot, such extension allowing the hinge to both facilitate level adjusting lateral and oppositely lateral pivoting movements of the support column and resist any longitudinal deflection of the support column.

To provide lateral stability to the column, and to commensurately provide cantilevering stability to the attached lateral header, a tensioned guy wire preferably extends from the upper end of the column to an anchoring point at the oppositely lateral end of the central header. In many cases, such oppositely lateral header end will extend oppositely laterally from the feeder house and, while such oppositely lateral extension is not needed in the instant invention for collection of cut plant materials, such oppositely lateral extension advantageously assists in the guy wire's triangulating support of the column. To provide for header level adjusting pivoting of the laterally cantilevering lateral header, extending and retracting means such as a hydraulic cylinder, winch, or screw pull assembly are preferably operatively attached to the guy wire.

Horizontal pivoting motions of the lateral header between the laterally cantilevering crop mowing position and the rearwardly extending transport position is preferably facilitated by cylindrical sleeves which are closely fitted to the preferably cylindrical column, such sleeves being rigidly mounted to the oppositely lateral end of the lateral header.

To provide vertical adjustability of the overall height of the lateral header for cutting crops of varying heights, a column clamping stop collar is preferably provided. Upon slidably raising the lateral header above such stop collar, such stop collar may be released from an initially clamped position, and may be re-clamped at a new selected elevation. Thereafter, the lateral header may be lowered into contact with the stop collar for operation at the adjusted elevation.

In use of the instant inventive header assembly, the lateral header may be pivoted forwardly about the support column until it cantilevers from the central header at the mowing position. Thereafter, the lateral header may be latched at the mowing position through operation of a preferably provided releasable latch. Provided that the height of the lateral header is adjusted to situate its cutter bar at an elevation immediately underlying the grain heads of a milo crop, an operator of a combine having the instant inventive assembly attached may drive along an edge of the crop while the lateral header cantilevers over the crop. Such crop edge operation of the instant invention advantageously harvests the milo grain heads in a swath having a width equivalent to the lateral dimension of the lateral header. Wheel crushing of remaining milo stalks passing under the lateral header is advantageously avoided by such cantilevering grain head cutting. Immediately following such grain head harvesting, a separate harvester may advantageously follow within the cutting path of the lateral header, and may advantageously subsequently harvest the remainder milo stalks for use as silage without tire crushing losses.

Accordingly, objects of the instant invention include the provision of a header assembly for mounting upon a harvester combine which incorporates structures, as described above, and which arranges those structures in relation to each other in manners described above for the achievement of functions and benefits described above.

Other and further objects, benefits, and advantages of the instant invention will become known to those skilled in the art upon review of the Detailed Description which follows, and upon review of the appended drawings.

STATEMENT REGARDING CHARACTER OF DRAWINGS

The drawings described below are photographic in character, and the Applicant does not petition for the allowance of photographic drawings. Notwithstanding, the Applicant asserts that the drawings are such that the prosecution can be carried out without the submission of corrected drawings showing the depicted structures in black lines only. It is, therefore, permissible pursuant to MPEP § 608.02(b) that the drawings be admitted for examination purposes only. Accordingly, the Applicant requests under MPEP § 608.02 (b) that the drawings be admitted for examination purposes only, and that any requirement of submission of corrected drawing pages be held in abeyance until completion of examination.

BRIEF DESCRIPTION OF THE DRAWINGS

FIG. 3 is a magnified view of a hinge component of the instant inventive assembly.

DETAILED DESCRIPTION OF A PREFERRED EMBODIMENT

Figure 1:
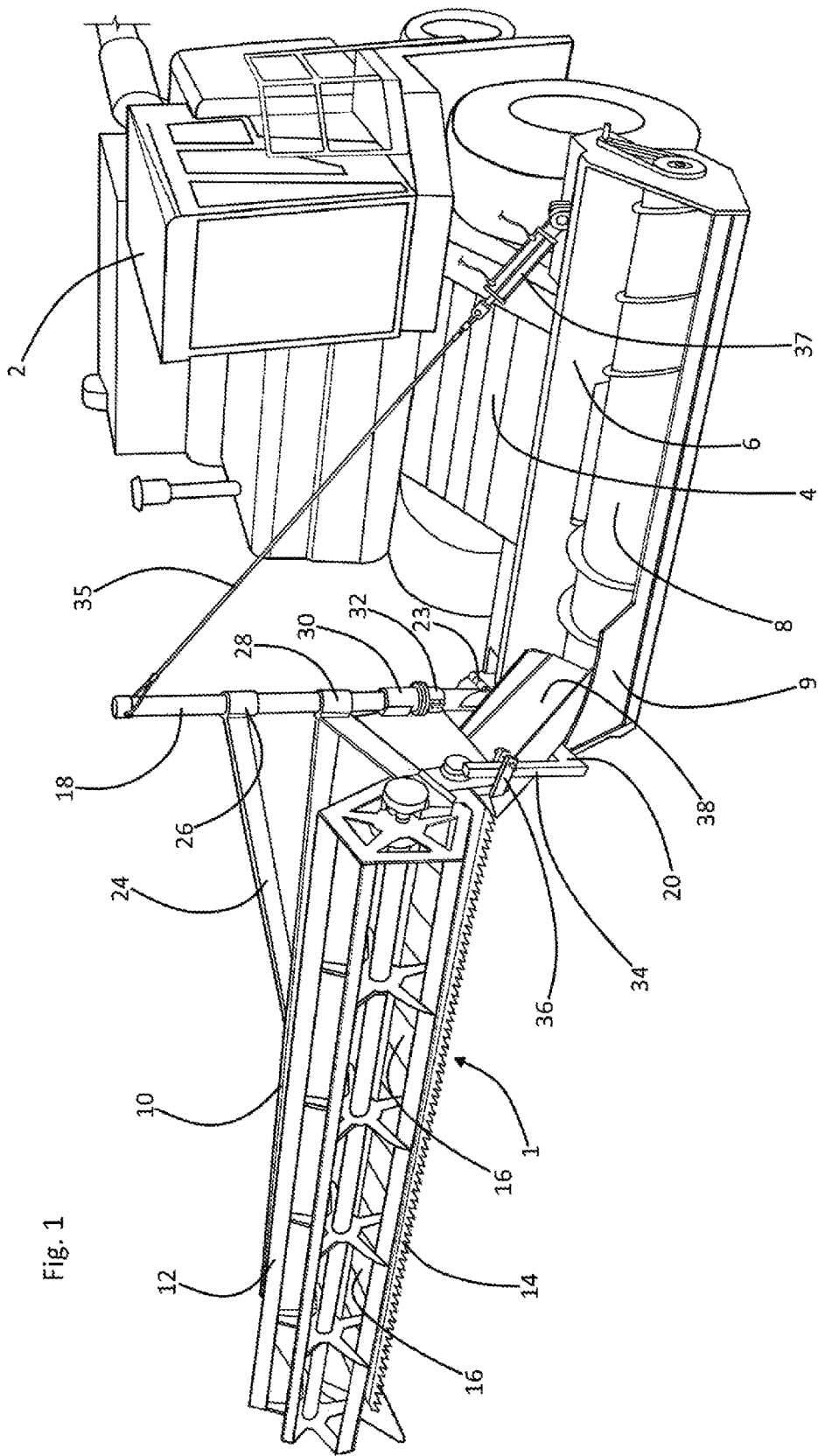
FIG. 1 is a perspective view of the instant inventive header assembly, the view additionally showing a harvester combine to which the header assembly is attached.

Referring now to the drawings and in particular to Drawing FIG. 1, a preferred embodiment of the instant inventive header assembly is referred to generally by Reference Arrow 1. A harvester combine 2 has a forward feeder house 4 having a forward opening 5. Cut plant material, such as milo grain heads, which passes rearwardly through a central opening 5 of a central header 6 may pass rearwardly into the forward opening of the feeder house 4 is conveyed via a continuous loop conveyor (not depicted within views) for processing steps within the combine 2 such as thrashing and sieve separating.

The central header component 6 is fixedly mounted to the forward end of the feeder house 4, such central header 6 having a powered rotary auger 8 mounted therein. Such auger 8 preferably has a lateral flight of helical vanes 7 which may oppositely laterally transport cut plant material which is deposited downwardly into the lateral end of the header 6. Upon reaching the center of the header 6, orbiting fingers 15 catch against the plant material, driving the material rearwardly into the central feeder house opening 5.

The central header 6 is preferably modified to include a forward retainer flange 9 which, in combination with the central header's rear wall 11, forms an upwardly opening capture bin. The auger 8 is intended as being representative of other types of conveyors which may transport the plant cuttings such as continuous loop belts.

Figure 2:
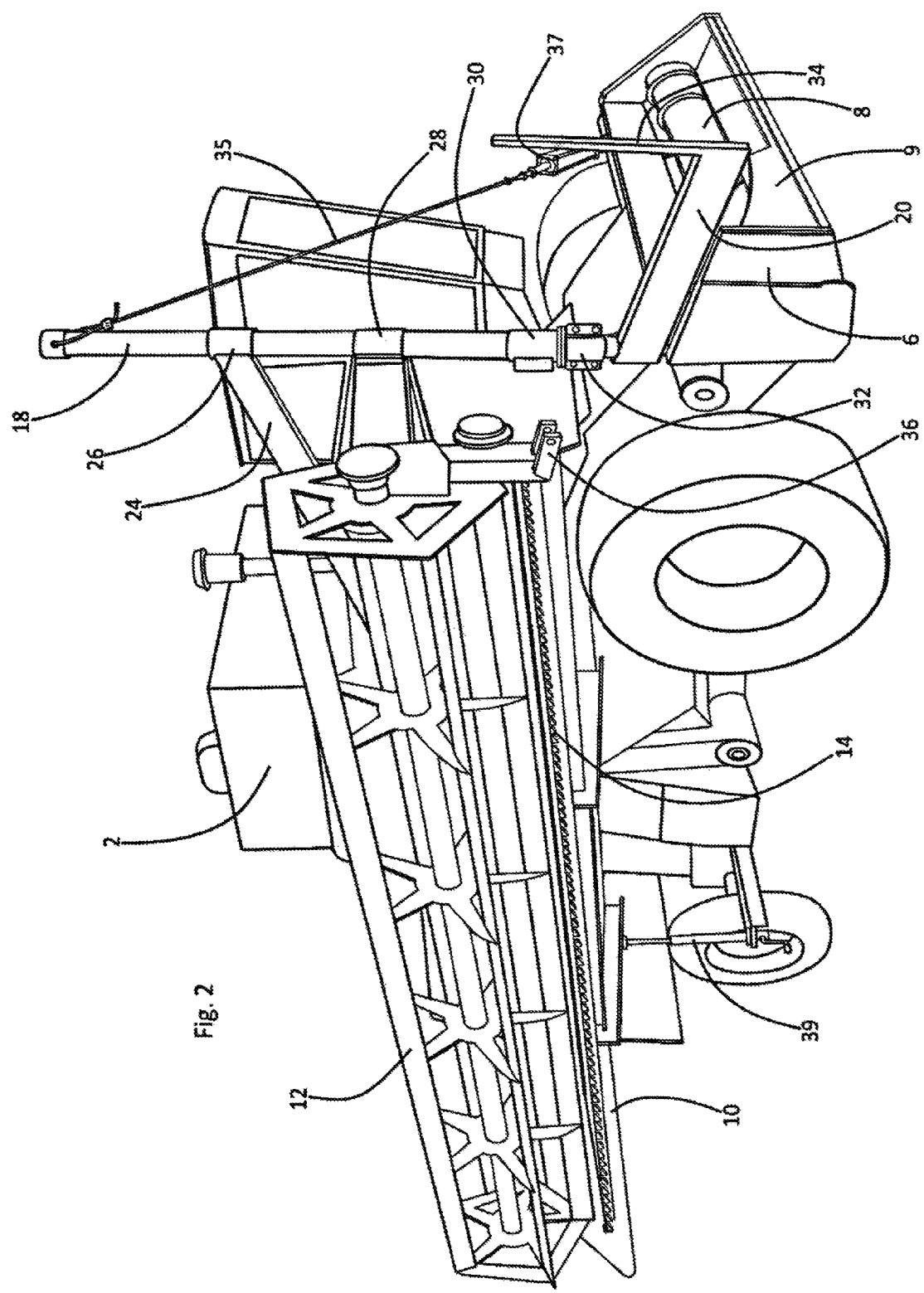
FIG. 2 is an alternate perspective view of the assembly of FIG. 1, the view of FIG. 2 showing a lateral header component pivoted rearwardly.

Referring simultaneously to FIGS. 1-3, a vertically extending column 18 is preferably fixedly and hingedly positioned at the lateral and rearward aspect or location of the central header 6. To effect such attachment and positioning, a longitudinally or forwardly extending "L" foot 20 is preferably rigidly welded to the lower end of the pivot column 18. Such "L" foot allows the utilization of a longitudinally elongated hinge pin 22 and hinge sleeve 23 combination as means for interconnecting the "L" foot 20 and the lateral wall of the central header 6. Such "L" foot adapted hinged connection of the pivot column 18 advantageously allows the pivot column 18 to hingedly move in the lateral and oppositely lateral directions while being restricted against any forward or rearward deflection.

A lateral header component 10 is preferably pivotally mounted upon the pivot column 18 by means of at least a first pivot sleeve 28. To assist in maintaining a substantially perpendicular orientation of the lateral header 10 with respect to the pivot column 18, additional pivot sleeves 26 and 30 are preferably provided, and a triangulating brace or gusset bar 24 may extend between the lateral header's rear wall 25 and the uppermost pivot sleeve 26.

The lateral header 10 preferably is equipped with a powered pickup reel 12, and a reciprocating cutter bar 14. An interior conveyor for transporting cut plant material oppositely laterally within the lateral header 10 is preferably provided, such conveyor preferably comprising a lightweight continuous loop belt 16 which has an oppositely laterally traveling upper flight, such belt 16 is considered as being representative of a rotary auger which may be alternatively incorporated for oppositely laterally conveying cut plant material.

The lateral header 10 is preferably adapted for vertical adjustment and positioning for operation at various selected elevations along the height of the pivot column 18. In a preferred embodiment, such vertical re-positioning means comprise a stop collar 32 which is clamped about the column 18 by means of eyed flange, bolt, and nut combinations 33.

In operation, the stop collar 32 may be compressively clamped about the pivot column 18 at an elevation which holds the oppositely lateral end of the lateral header 10 at a position which immediately overlies the lateral end of the central header 6. A transfer chute 38 is preferably provided for guiding the oppositely laterally passing output of the lateral header 10 downwardly and into the lateral end of the central header 6.

To further hold the header 10 and chute 38 at the header-to-header transfer position depicted in FIG. 1, a releasable latch is preferably provided. In the preferred embodiment, a latch bar 34 extends substantially vertically from the forward end of the "L" foot 20, and a matching latch bracket 36 is attached to the forward and oppositely lateral end of the lateral header 10. Upon an engagement of latch bracket 36 with latch bar 34, rearward pivoting movement of the lateral header 10 about pivot column 18 is advantageously resisted. Alternatively, upon a release of the latch bracket 36 from bar 34, the lateral header 10 is advantageously freed to pivot from the mowing position depicted in FIG. 1, toward the narrower transport position depicted in FIG. 2. Upon adjustment of the vertical height of the header 10, the latch bracket 36 may slidably move along the vertical length of the latch bar 34. A rear support pedestal 39 is preferably provided for supplementary support of the lateral end of the lateral header 10 upon rearward pivoting to the transport position depicted in FIG. 2.

In order to hold the pivot column 18 at its substantially vertical orientation, and to simultaneously hold the lateral header 10 at the depicted substantially horizontal orientation, a tensioned guy wire 35 is preferably provided. In a preferred embodiment, the guy wire 35 extends from the upper end of the pivot column 18 downwardly and oppositely laterally for fixed anchoring at the oppositely lateral end of the central header 6. Means for alternatively extending and retracting the guy wire 35 are preferably provided, such means suitably comprising a powered hydraulic cylinder 37. Such cylinder 37 is intended as being representative of other suitably substituted wire extending and retracting mechanisms such as winches and screw pulls. Upon operation of the hydraulic cylinder 37 to effectively shorten and retract the guy wire 37, column 18 oppositely laterally pivots about hinge 20,22,23, such motion effectively raising the lateral end of the lateral header 10. Alternatively, operation of the hydraulic cylinder 37 to upwardly and laterally extend the guy wire 35 may advantageously selectively lower the lateral end of the lateral header 10.

In use of the instant inventive header assembly 1, the stop collar 32 may be selectively positioned and clamped upon the pivot column 18 at an elevation which coincides with a desired grain head cutting elevation. To allow the stop collar 32 to be freely slidably moved to the desired elevation, the lateral header may be temporarily raised through use of a separate jacking apparatus (not depicted within views). Upon re-clamping the lock collar 32 at the selected height, the lateral header 10 may be slidably lowered along the pivot column 18 until the lower pivot sleeve 30 comes into bearing contact with the upper annular flange of the lock collar 32. Thereafter, the lateral header 10 may be pivoted forwardly to cantilever laterally in the mowing position of FIG. 1. Thereafter, the hydraulic cylinder 37 may be operated to extend or retract the guy wire 35 for horizontal leveling of the lateral header 10, and bracket 36 may be bolted in engagement with latch bar 34.

Following such assembly and positioning adjustments of the lateral header 10, the harvester combine 2 may be driven and operated along an outside edge of, for example, a milo crop, such edge being represented by dashed line 50. Such operation advantageously harvests a wide swath of grain heads extending laterally to dashed line 52. As a result of the instant invention's laterally cantilevered cutting of grain heads, the wheels 3 of the harvester combine 2 advantageously roll over the ground without damaging milo stalks which are preserved for subsequent harvesting as silage.

Upon termination of harvesting use of the lateral header 10, latch 34,36 may be released, and the header 10 may be counter-pivoted rearwardly approximately 90° to the transport position depicted in FIG. 2. In such transport configuration, the harvester 2 may be conveniently driven upon agricultural roads and through gateways. To lessen excessive torsion forces experienced at sleeves 26, 28, and 30, and at hinge 20, 22, and 23 during such transport, a rear support column 39 is preferably engaged with the undersurface of the lateral header 10.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A header assembly for mounting upon a harvester combine feeder house, the header assembly comprising:
   (a) a central header adapted for fixed attachment to the feeder house, the central header having lateral and oppositely lateral ends;
   (b) a lateral header having lateral and oppositely lateral ends; and
   (c) a pivot joint attaching the oppositely lateral end of the lateral header to the lateral end of the central header, the pivot joint facilitating movements of the lateral header between a mowing position and a transport position wherein the lateral header cantilevers laterally in alignment with the central header upon pivoting to the mowing position and the lateral header extends rearwardly from the central header upon counter-pivoting to the transport position, wherein the pivot joint comprises a vertically extending column having upper and lower ends, and wherein the pivot joint further attaches the column's lower end to the central header's lateral end.

2. The header assembly of claim 1 wherein the attachment of the column's lower end comprises a hinge adapted for facilitating alternative upward and downward pivoting movements of the lateral header.

3. The header assembly of claim 2 further comprising a guy extending between the column's upper end and the central header's oppositely lateral end.

4. The header assembly of claim 3 further comprising extending and retracting means connected operatively to the guy, said means being adapted for effecting the alternative upward and downward pivoting movements of the lateral header.

5. The header assembly of claim 4 wherein the extending and retracting means comprise an hydraulic cylinder.

6. The header assembly of claim 4 wherein the lateral end of the central header and the oppositely lateral end of the lateral header are, upon the pivoting of the lateral header to the mowing position, further interconnected by a latch, said latch being adapted for alternatively resisting and permitting the movements of the lateral header toward the transport position.

7. The header assembly of claim 2 wherein the vertically extending column is cylindrical and wherein pivot joint comprises said column and at least a first sleeve, the at least first sleeve being rigidly mounted to the lateral header and being rotatably mounted over said column.

8. The header assembly of claim 7 wherein the pivot joint comprises a height adjustment collar, said collar being movably mounted upon the vertically extending column and being adapted for alternatively holding the lateral header at raised and lowered positions.

9. The header assembly of claim 8 further comprising a transfer chute operatively extending from the oppositely lateral end of the lateral header toward the lateral end of the central header.

10. A header assembly for mounting upon a harvester combine feeder house, the header assembly comprising:
    (a) a central header adapted for fixed attachment to the feeder house, the central header having lateral and oppositely lateral ends;
    (b) a lateral header having lateral and oppositely lateral ends;

(c) a pivot joint attaching the oppositely lateral end of the lateral header to the lateral end of the central header, the pivot joint facilitating movements of the lateral header between a mowing position and a transport position wherein the lateral header cantilevers laterally from the central header upon pivoting to the mowing position and the lateral header extends rearwardly from the central header upon counter-pivoting to the transport position; and (d) a transfer chute operatively extending from the oppositely lateral end of the lateral header to the lateral end of the central header; wherein the pivot joint comprises a vertically extending column having upper and lower ends, wherein the pivot joint further attaches the column's lower end to the central header's lateral end; wherein the attachment of the column's lower end comprises a hinge adapted for facilitating alternative upward and downward pivoting movements of the lateral header; wherein the vertically extending column is cylindrical and wherein pivot joint comprises said column and at least a first sleeve, the at least first sleeve being rigidly mounted to the lateral header and being rotatably mounted over said column; wherein the pivot joint comprises a height adjustment collar, said collar being movably mounted upon the vertically extending column and being adapted for alternatively holding the lateral header at raised and lowered positions; and wherein the lateral header comprises a cutter bar, a reel, and a continuous loop belt, said belt having an oppositely laterally moving upper flight, said flight extending between the lateral header's lateral and oppositely lateral ends.

11. The header assembly of claim 10 wherein the central header has a central output port, and wherein the central header comprises an auger spanning at least between the central output port and the central header's lateral end.

\* \* \* \* \*